United States Patent [19]

Geiermann

[11] Patent Number: 4,661,673
[45] Date of Patent: Apr. 28, 1987

[54] CONTINUOUS MOTION CIRCUMFERENTIAL SEAM WELDER

[75] Inventor: Thomas J. Geiermann, Bangor Township, Bay County, Mich.

[73] Assignee: Newcor, Inc., Troy, Mich.

[21] Appl. No.: 770,532

[22] Filed: Aug. 28, 1985

[51] Int. Cl.4 .................. B23K 11/32; B23K 37/04
[52] U.S. Cl. ............................. 219/64; 219/79; 219/67
[58] Field of Search ............... 219/59.1, 64, 67, 79, 219/83, 82, 81

[56] References Cited

U.S. PATENT DOCUMENTS

| | | | |
|---|---|---|---|
| 3,290,478 | 12/1966 | Morley | 219/79 |
| 3,440,392 | 4/1969 | Erlandson et al. | 219/64 X |
| 3,553,419 | 1/1971 | Garver et al. | 219/79 X |

FOREIGN PATENT DOCUMENTS 702802 1/1965 Canada .................. 219/79

74396 6/1981 Japan .................... 219/64

*Primary Examiner*—E. A. Goldberg
*Assistant Examiner*—C. M. Sigda
*Attorney, Agent, or Firm*—Flynn, Thiel, Boutell & Tanis

[57] ABSTRACT

A method and apparatus for creating a circumferential seam weld in surrounding relationship to a cylindrical workpiece. The workpiece is moved continuously along a work path at a preselected velocity, and is simultaneously supported for free rotation about its longitudinal central axis. The workpiece moves into engagement with opposed surfaces defined by a pair of electrodes, one of which moves relative to the other and relative to the workpiece for causing rotation of the workpiece through approximately one-half revolution, whereby the two electrodes simultaneously form two welds which are about 180° apart and which may individually extend up to a total angle of rotation of about 180°, or slightly in excess thereof, so that the welds overlap.

19 Claims, 6 Drawing Figures

CONTINUOUS MOTION CIRCUMFERENTIAL SEAM WELDER

BACKGROUND OF THE INVENTION

1. Field of the Invention

This invention relates to an apparatus for seamwelding cylindrical workpieces and, more particularly, to an improved apparatus which permits such seam welding to be accomplished while the workpiece is moved continuously through and between a pair of opposed electrodes.

2. Background Art

Many cylindrical objects, such as oil-filter cans and shock absorber bodies, have a resistance-type seam weld extending therearound for fixedly and sealingly securing the cylindrical side wall of the can to an end wall or the like. Such circumferential weld is conventionally performed on an intermittently movable indexing table which sequentially moves the can into position between a pair of opposed electrode wheels. The indexing table is stopped when the can is positioned between the electrode wheels, and these wheels then move inwardly to engage the can on substantially diametrically opposite sides thereof, whereupon rotation of the electrode wheels and a corresponding rotation of the can through an angle of about 180° creates a seam weld which extends continuously around the can. The electrode wheels are then moved radially outwardly away from the can, and the indexing table is rotated through a further increment so as to remove the welded can and simultaneously move the next can into the welding station. While such apparatus can successfully accomplish a satisfactory seam weld on the can, nevertheless the production rate of such equipment is rather low since the incremental or stepping movement of the indexing table severely limits the rate at which cans can be satisfactorily welded since substantial time is lost between successive welding operations. This significant lost time between successive welding operations severely restricts the number of cans which can be welded per unit time, and hence severely reduces the overall production efficiency.

SUMMARY OF THE INVENTION

Accordingly, the purpose of this invention is to provide an improved welding apparatus and method for yielding a significantly higher production rate of circumferentially resistance seam welded cylinders or cans. This objective is accomplished in the present invention by reducing the time between sequential welds to a minimum, thereby significantly increasing the rate at which cans or cylinders can be welded per unit time. This significant increase in production rate is accomplished in the method and apparatus of this invention by effecting seam welding of the cylinder while it is being continuously moved along a work path, thereby avoiding intermittent movement and particularly stoppage of the cylinder.

The objects and purposes of this invention, as briefly explained above, are provided in the method and apparatus of the present invention by supporting the cylinder on a rotating tooling or support which moves the cylinder along a work path which extends between a pair of opposed electrodes. One of the electrodes is stationary, and the other is rotatable. As the tooling movably transports the cylinder along the work path, the cylinder moves into engagement with the opposed electrodes on substantially diametrically opposite sides thereof and, as the tooling continues to rotatably move the cylinder along the work path, one of the electrodes is additionally rotated at a different rate to effect rotation of the cylinder between the electrodes, whereby two welds are simultaneously created 180° apart, which welds connect in series so as to complete a 360° weld. If desired, a weld of less than 360° can be accomplished by adjusting the rates of rotation and/or the timing of the current pulse to the electrodes. The cylinder moves continuously through the electrodes such that, as the leading cylinder is leaving the electrodes after completion of the seam weld, the next trailing cylinder is moving into engagement with the electrodes so that the production rate is significantly increased. The production rate is thus limited primarily by the electrode engagement times inasmuch as transfer times have been substantially eliminated.

Other objects and purposes of the invention will be apparent to persons familiar with structures and methods of this general type upon reading the following specification and inspecting the accompanying drawings.

Figure 4:
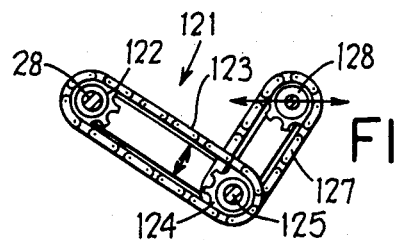
FIG. 4 is a fragmentary view taken substantially along line IV—IV in FIG. 1.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Figure 1:
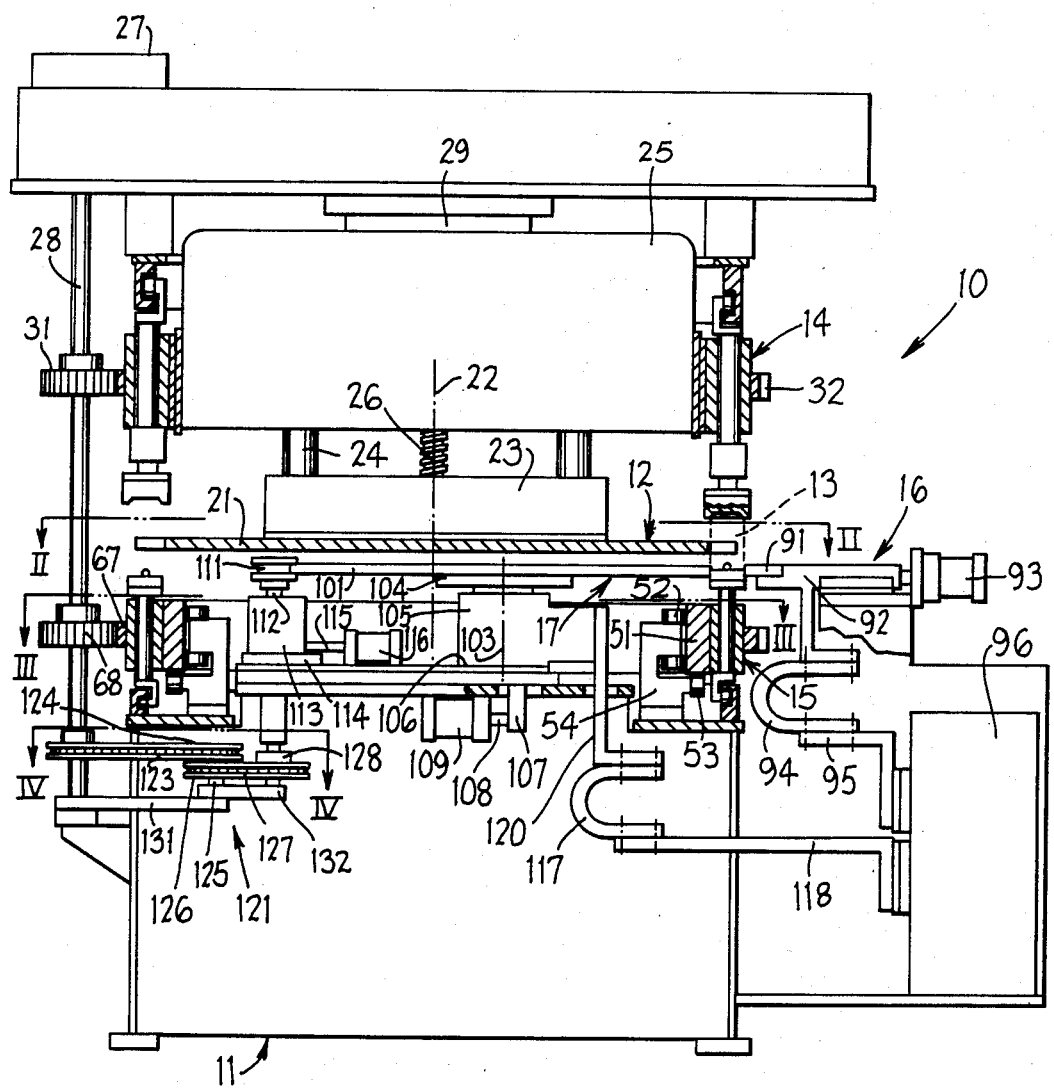
FIG. 1 is an elevational view, partially in cross section, of the welding apparatus of this invention.

Referring to the drawings, and specifically FIG. 1, there is illustrated a welding apparatus 10 according to the present invention. This apparatus includes a support frame or housing 11 which supports thereon a rotary transfer means 12 for effecting continuous movement of workpieces 13, specifically cylinders, along a working path. The rotary transport mechanism 12 has upper and lower workpiece support means 14 and 15, respectively, associated therewith for supporting opposite ends of the workpieces 13 throughout that phase of movement during which the welding operation occurs. An outer electrode assembly 16 is disposed adjacent the periphery of the rotary transport mechanism 12, and an inner electrode assembly 17 is positioned below the rotary transport mechanism. These electrode assemblies 16-17 jointly cooperate with a workpiece 13 to create a continuous seam weld therearound, as explained hereinafter.

Figure 2:
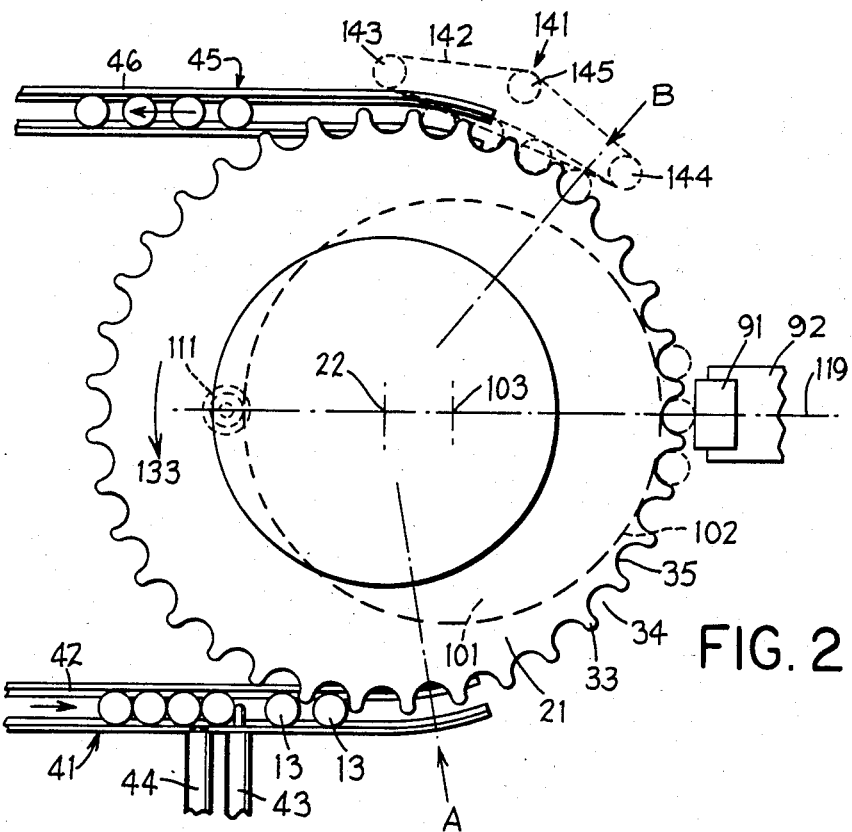
FIGS. 2 and 3 are fragmentary views taken substantially along lines II—II and III—III, respectively, in FIG. 1.

The rotary transfer mechanism 12, as illustrated by FIGS. 1 and 2, includes a workpiece conveying wheel 21 which is rotatably supported on the frame for rotation about its central vertical axis 22. This transfer or conveying wheel 21 has a support plate 23 fixed to the central part thereof, and this in turn is slidably supported on a plurality of vertically extending slide rods 24 which are fixed to and project downwardly from a head member 25, the latter being rotatably supported on the frame through a bearing and spindle arrangement 29. The head member 25 has a rotatable adjustment screw 26 rotatably supported thereon and extending downwardly for threaded engagement with the support plate 23 so that, by selective rotation of the screw 26, the elevation of the conveying wheel 21 can be adjusted as desired.

To effect rotation of the conveying wheel 21, there is provided a motor 27 which rotatably drives a vertically extending drive shaft 28, the latter having a small drive pinion 31 fixed thereto and disposed in meshing engagement with a ring gear 32 which is secured to and rotatably drives the head member 25.

The conveying wheel 21, as illustrated by FIG. 2, is formed substantially as a gear or sprocket member in that it is provided with a plurality of radially outwardly projecting teeth or projections 33 disposed at uniform angularly spaced intervals therearound, which teeth define recesses 34 therebetween. The recesses 34 have a rounded bottom wall 35 which is substantially semicircular and has a diameter which closely conforms to, but normally is slightly greater than, the diameter of the workpiece 13.

The workpiece 13, in the illustrated embodiment (see FIGS. 5 and 6), comprises a cylindrical member 36 which is formed substantially as a can having a cylindrical side wall which may be totally or partially enclosed at one end by a top wall. This cylinder 36, in the open lower end thereof, has a metal end plate 37 disposed therein. The end plate 37 may be closed or may, as shown in the preferred embodiment, have a central opening 38 therethrough. The plate 37 and cylinder 36 are fixedly and sealingly joined together by creating a continuous circumferential seam weld therebetween, as explained below.

To supply the workpieces 13 to the conveying wheel 21, there is provided, as shown in FIG. 2, a workpiece supply device 41 which includes an elongated guideway 42 on which a series of upright workpieces 13 are movably supported. The guideway 41 extends inwardly in substantially tangential relationship to the conveying wheel so as to permit the workpieces to be continuously supplied in spaced relationship into the adjacent recesses 34 of the rotating wheel 21. The workpiece supply device 41 has retractable stop mechanisms 43 and 44 associated therewith to intermittently stop and hence create the desired spacing between the workpieces 13 so as to permit them to be supplied to the recesses 34.

A similar workpiece removal device 45 is also disposed for association with the conveying wheel 21. This removal device 45 again includes an elongated guideway 46 which extends substantially tangentially to the conveying wheel 21 so as to receive thereon the workpieces and hence permit their removal from the conveying wheel.

The workpiece supply and removal device 41 and 45 are conventional and well known inasmuch as automatic loading and unloading devices of this type are commonly utilized in the bottling and canning industry, and hence further description of such devices is believed unnecessary.

Figure 3:
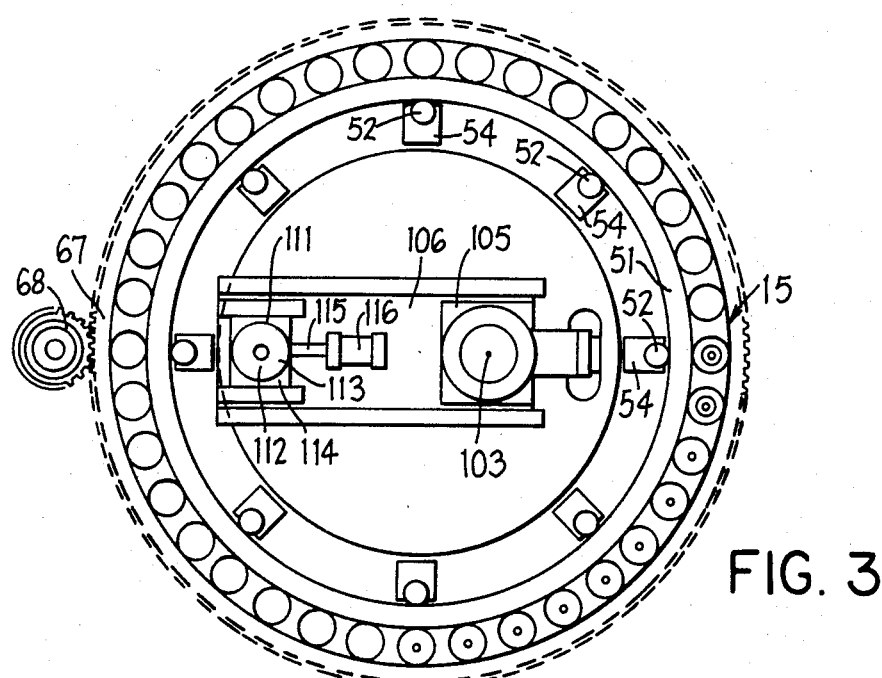
Figure 5:
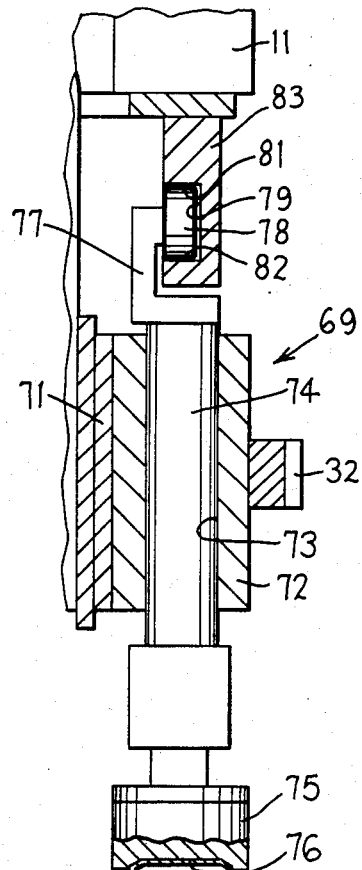
FIG. 5 is an enlarged fragmentary view, partially in cross section, illustrating the support of the workpiece and its engagement between the electrodes.
Figure 5:
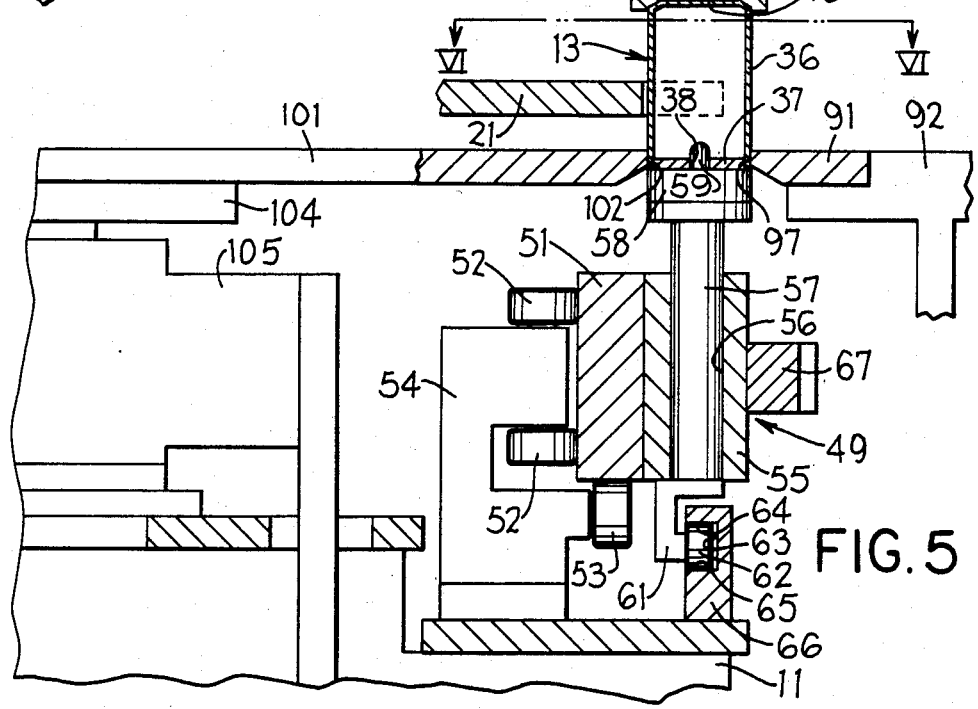

Referring now to FIGS. 1, 3 and 5, the lower workpiece support means 15, as shown, includes a support ring 51 which is rotatably supported on the frame 11 for rotation about the central axis 22. For this purpose, the support ring 51 is rollingly supported on rollers 52 and 53, the latter being rotatably supported on a plurality of supports 54 which are spaced circumferentially around the ring and are fixedly supported on the frame 11.

This support ring 51 mounts thereon a plurality of lower support mechanisms 49 in uniformly angularly spaced relationship therearound. Each mechanism 49 includes a vertically elongated guide tube 55 fixed to the support ring 51. The individual guide tubes 55 are disposed so that they are substantially aligned directly below the center of a respective recess 34 as associated with the conveying wheel 21. Each guide tube 55 has a vertical opening 56 extending coaxially therethrough, and a support rod 57 is slidably disposed within and extends vertically through this latter opening. The support rod 57 has an enlarged head 58 secured to the upper end thereof, which head 58 has an outer diameter which is substantially equal to or slightly less than the outer diameter of the workpiece 13. Head 58 has, on the upper surface thereof, an upwardly projecting pin 59 which is adapted to project through the central opening 38 formed in the end plate 37 of the workpiece.

The lower end of support rod 57 has a yoke 61 secured thereto, which yoke rotatably supports thereon a cam roller 62. This cam roller 62 is supported for rolling engagement within a cam groove 63 which is defined between opposed upper and lower cam surfaces 64 and 65, respectively. This cam groove 63 is formed within a cam ring 66 which is fixedly secured to the frame 11. The cam surfaces 64 and 65, and the groove 63 defined therebetween, are of annular configurations centered about the central axis 22. This cam groove 63 is provided with a vertical profile which controls the vertical slidable displacement of the slide rod 57.

The support ring 51, and the plurality of lower workpiece support mechanisms 49 mounted thereon, is rotatably driven by means of a ring gear 67 which is secured to and externally surrounds the support ring 51. This ring gear 67 is disposed in continuous meshing engagement with a drive gear 68, the latter being nonrotatably secured to the drive shaft 28. This drive pinion 68 and ring gear 67 are identical to the aforementioned drive pinion 31 and ring gear 32, whereby the lower workpiece support 15 is hence driven synchronously with the conveying wheel 21.

The upper workpiece support means 14 is of a generally similar construction in that it includes a support ring 71 which is secured to and externally surrounds the head member 25 and hence rotates synchronously therewith. This support ring 71 supports thereon the plurality of upper workpiece support mechanisms 69 in uniform angularly spaced relationships therearound. The upper workpiece support mechanisms 69 are vertically aligned directly above respective lower workpiece support mechanisms 49. Each upper support mechanism 69 includes a vertically elongated guide tube 72 having a vertical opening 73 extending coaxially therethrough. A vertically elongated support rod 74 is slidably supported within and projects outwardly from opposite ends of this opening 73. Rod 74 has an enlarged head 75 on the lower end thereof, which head in the illustrated embodiment has a concave recess 76 formed in the lower surface thereof so as to receive therein and hence supportingly engage the upper end of the workpiece 13.

The upper end of rod 74 has a yoke 77 thereon which rotatably supports a cam roller 78, the latter being confined within an annular cam groove 79 as formed in a cam ring 83 which is fixed to the frame 11. This cam groove 79 is defined between upper and lower cam surfaces 81 and 82, and the cam groove has a vertical profile thereon which substantially identically but reversely corresponds to the profile of the lower cam groove 63.

Figure 6:
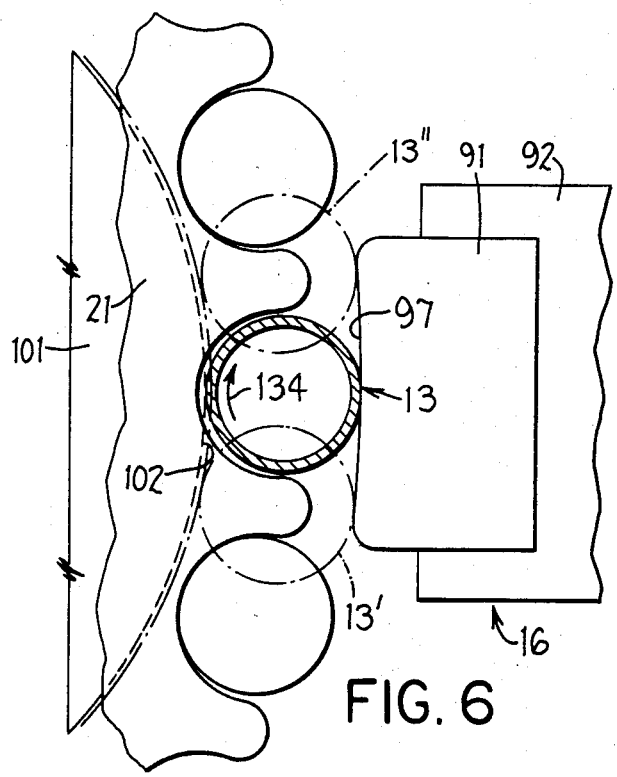
FIG. 6 is a fragmentary view taken substantially along line VI—VI in FIG. 5.

Considering now the outer electrode assembly 16, as shown in FIGS. 5 and 6, same includes a platelike electrode 91 (hereinafter referred to as the stationary electrode) which is fixedly secured to a head member 92. The electrode 91 is disposed slightly below and closely adjacent the outer periphery of the conveying wheel 21, and the head member 92 thereof is supported for slidable adjusting movement in a direction which projects radially inwardly toward the central axis 22. For this purpose, the head member is secured to the piston rod of a conventional fluid pressure cylinder 93.

The conductive head member 92 has flexible electrical conductors connected thereto, which conductors are disposed within a laminated strap 94. This strap at its other end is connected to a buss bar 95 as associated with a conventional power source 96, such as a welding transformer. The electrode 91 has a contact surface 97 formed on the front face thereof, which surface 97 is of a slight concave curvature in that this surface is preferably generated on the radius centered about the central axis 22. This surface 97 has a length which is substantially equal to or slightly greater than one-half the circumference of the workpiece 13.

The inner electrode assembly 17, as illustrated by FIGS. 1, 2 and 3, includes an inner electrode 101 which is formed substantially as a large diameter circular plate or wheel. This inner electrode wheel 101 has an outer annular surface 102 extending around the periphery thereof, which surface 102 is at substantially the same elevation as and disposed directly opposite from the surface 97 of the stationary electrode 91.

Inner electrode wheel 101 is supported for rotation about its central vertical axis 103, and for this purpose the electrode wheel 101 has a central hub 104 which is rotatably supported within a head 105, the latter being horizontally slidably supported for linear movement within a channel-like guide structure 106 which is fixed to the frame 11. This head 105 has a downwardly projecting arm 107 which is connected to the piston rod 108 of a fluid pressure cylinder 109 so as to permit radial shifting of the head 105, and hence radial shifting of the rotary inner electrode wheel 101. The guide structure 106 permits slidable displacement of the head 105, and of the electrode axis 103, radially of the conveying wheel so that the central axis 103 intersects and is movable along a radial line 119 which extends from the central rotational axis 22 to the midpoint of the electrode surface 97.

To effect rotation of the inner electrode wheel 101, the outer annular surface 102 thereof is disposed in frictional driving engagement with a drive wheel 111 which engages the annular surface 102 of wheel 101 at a location which is disposed substantially diametrically opposite the fixed stationary electrode 91 substantially along the radial line 119. As shown in FIGS. 1 and 3, this drive wheel 111 is secured to a shaft 112 which is rotatably supported on a head member 113. This head member 113 is supported for linear horizontal slidable movement within a channel-like guide structure 114 which is fixedly associated with the frame 11. This guide structure 114 extends in the same direction as the guide structure 106 and hence permits the head 113, and the rotational axis of the drive wheel 111, to be disposed so as to always intersect but move along the radial line 119. The head 113 is secured to the rod 115 of a conventional fluid pressure cylinder 116, which cylinder always urges the drive wheel 111 radially inwardly so as to maintain a secure frictional contact with the weld wheel 101.

The head 105 is joined to the transformer power source 96, and for this purpose the head 105 has a downwardly projecting arm 120 which is secured to one end of conductors enclosed within a laminated strap 117, which strap at its other end is secured to a buss bar 118 which projects from the transformer 96.

To effect the desired rotation of the drive wheel 111, there is provided a drive mechanism 121 (FIGS. 1 and 4) for joining the drive wheel 111 to the main drive shaft 28. This drive mechanism 121 includes means for compensating for variation in the spacing between the parallel shafts 28 and 112. For this purpose, the drive mechanism includes a drive sprocket 122 which is secured to shaft 28 and drivingly engages a first drive chain 123. Chain 123 drives a first intermediate sprocket 124 which is nonrotatably secured to an intermediate shaft 125. This shaft 125 is free to float within a plane perpendicular to its rotational axis. The intermediate shaft 125 has a second intermediate sprocket 126 secured thereto, and the latter drives a second chain 127 which is in driving engagement with a driven sprocket 128, the latter being secured to the lower end of shaft 112 so as to effect rotation of the drive wheel 111.

The proper spacing between the sprockets of the drive mechanism 121 is maintained by means of a first arm 131 which extends between and has the lower ends of the shafts 28 and 125 supported thereon, and a second arm 132 which extends between and has the lower ends of the shafts 125 and 112 supported thereon.

The drive mechanism 121, and the diametrical size relationship between the drive wheel 111 and weld wheel 101, are such that the peripheral velocity of the weld wheel 101 is substantially twice the peripheral velocity of the conveying wheel 21 (the peripheral velocity of the conveying wheel 21 being measured substantially at the center of the recess 34, which center defines the rounded bottom wall 35).

OPERATION

In operation, the conveying wheel 21 and the upper and lower workpiece support means 14 and 15 are rotated at a uniform rotational velocity. The workpieces 13 are supplied from the supply device 41 into the recesses 34, whereupon the workpieces travel with the conveying wheel 21 through approximately one-half revolution, during which time the workpieces are subjected to a welding operation as explained below. The workpieces are then discharged from the conveying wheel to the discharge device 45 for removal from the welding station.

As the upper and lower workpiece support mechanisms 69 and 49 rotate synchronously with the conveying wheel 21 in the direction of the arrow 133 in FIG.

2, the individual workpieces 13 are fed into the recesses 34 as the recesses approach the station designated A. At this point, the lower and upper workpiece supports 49 and 69 are respectively raised and lowered so that the support heads 58 and 75 thereon vertically move toward one another and hence supportingly engage the opposite ends of the workpiece 13, substantially as illustrated in FIG. 5. While the workpiece 13 is supportingly engaged in the manner illustrated by FIG. 5, the workpiece 13 is maintained out of engagement with the conveying wheel 21, and in fact there is normally maintained a slight clearance space between the conveying wheel and the workpiece as indicated in FIG. 6 inasmuch as the workpieces are now being rotatably supported and conveyed by the upper and lower support means. The workpiece is hence conveyed into the welding gap defined between the stationary electrode 91 and the rotating electrode wheel 101, which gap is defined between the opposed surfaces 97 and 102 as illustrated in FIG. 6. The length of the surface 97 is such that one workpiece, such as the workpiece 13' indicated by dotted lines in FIG. 6, is just entering the welding gap as the next preceding workpiece, as indicated by dotted lines at 13'', is just leaving the welding gap.

As the workpiece moves into engagement with the electrode surfaces 97 and 102, it contacts the stationary surface 97 at one point, and also contacts the moving surface 102 at a substantially diametrically opposite point. This surface 102 is moving at a velocity which is substantially twice the velocity which exists at the central axis of the workpiece. Hence, this causes the workpiece 13 to rollingly engage both surfaces 97 and 102 so that the workpiece hence undergoes rotational movement about its own axis through an angle equal to or slightly in excess of 180° when passing through the welding gap. Hence, the surface 97 has a length which is substantially equal to, but normally slightly exceeds, one-half the circumferential length of the workpiece 13. During the rolling engagement of the workpiece 13 with the surfaces 97 and 102, the stationary electrode 91 effects a first seam weld which extends over approximately 180° of the periphery of the workpiece 13, and simultaneously therewith the electrode wheel 101 creates a second seam weld which also extends over approximately 180°. As described in the preferred embodiment, these two welds only extend slightly in excess of 180° so that the two welds are joined together in series and slightly overlap so as to create a 360° weld which fixedly and sealingly joins the cylinder 36 to the end plate 37. By changing the length of time during which the current pulse is applied to the electrodes and/or the speed of rotation of the electrode wheel 101 and conveying wheel 21, circumferential welds of less than 360° can be accomplished.

During movement of the workpiece through the welding gap, such as during movement from the inlet end thereof to the center of the gap, such as illustrated by the workpiece 13 shown by solid lines in FIG. 6, the rotating weld wheel 101 must move slightly away from the stationary electrode surface 97 due to the fact that the rotating weld wheel 101 has a rotational axis which is different from that of the central axis 22. For this purpose, the weld wheel 101 and its rotational axis 103 can move radially toward the central axis 22 since the pressure cylinder 109 functions as a biasing means which permits the rotating electrode wheel 101 to radially float relative to axis 22 while maintaining a substantially constant contact pressure against the workpiece 13. During this compensating or radial movement of the rotating electrode wheel 101, the drive wheel 111 similarly undergoes a compensating movement as permitted by its pressure cylinder 116, and the permissible compensating movement of the drive mechanism 121.

Hence, the workpiece 13 is fed into the inlet end of the welding gap defined between the electrode surfaces 97 and 102 and is then moved rollingly (in the direction of arrow 134 shown in FIG. 6) through the gap. At the same time, a uniform contact pressure is maintained between the workpiece and the opposed electrodes 91 and 101 so as to create a seam weld of desired quality and uniformity.

The continuing movement of the workpiece 13 along its path due to the continual and uniform rotation of the conveying wheel 21 and the upper and lower support means 15 and 14 permits one workpiece to be moved into engagement with the electrodes 91 and 101 at substantially the same time that the preceding workpiece is leaving the welding gap, such as indicated by the workpieces 13' and 13'' in FIG. 6. Thus, the transfer time between sequential welding operations is substantially reduced to zero so that the welding rate can be maximized.

To facilitate the discharge of workpieces from the conveying wheel after the welding operation has been completed, the apparatus is normally provided with an assisting device to temporarily hold the workpieces in engagement with the wheel 21 prior to deposit of the workpieces on the removal device 45. This assisting device, in the illustrated embodiment (FIG. 2), comprises an assisting mechanism 141 which employs a belt 142 extending between end pulleys 143 and 144 and an intermediate pulley 145. This belt 142 has an inner reach which extends over the transition area adjacent the upstream end of the removal device 45 so that the belt 142 engages the outer periphery of the workpieces 13 and urges them frictionally into engagement with the bottom walls of the recesses 34. Hence, the belt 142 engages the workpieces 13 slightly upstream of the station designated B, at which station the workpiece support mechanisms 49 and 69 move vertically in opposite directions away from the workpiece 13 so as to disengage the latter, whereupon the workpiece 13 is then held on the conveying wheel 21 solely by the belt 142. The belt 142 holds the workpieces 13 in position until they are moved into engagement with the removal device 45, at which point the workpieces 13 will be supported on the removal devices and hence are disengaged from the belt 142. While this mechanism 141 is disclosed for purposes of illustration, it will be appreciated that numerous other devices could be utilized for accomplishing this same function.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for creating a circumferential seam weld around a series of cylindrical workpieces, comprising:
   workpiece conveying means for continuously moving a series of cylindrical workpieces in spaced relationship along a work path, wherein the cylindrical workpieces have opposite ends, said workpiece conveying means including first and second support means for supportingly engaging opposite ends of individual workpieces while permitting the individual workpieces to be rotated about their central longitudinal axes; and welding electrode means for sequentially engaging each workpiece as it moves along said work path for causing rotation of the respective workpiece about its central axis while simultaneously creating two seam welds which individually extend around a predetermined angle of rotation of the workpiece;

said welding electrode means including a first electrode having a first elongate electrode surface thereon which extends substantially parallel to said work path and engages each workpiece on a first side thereof, said welding electrode means including a second movable electrode having a second elongate electrode surface thereon which engages each workpiece on a second side thereof which is substantially diametrically opposite said first side, and means for moving said second electrode surface at a velocity which is a predetermined amount greater than the movement velocity of said conveying means for causing rotation of each workpiece about its own central axis when the workpiece is engaged between said first and second electrode surfaces.

2. An apparatus according to claim 1, wherein said conveying means comprises a conveying wheel supported for rotation about a first substantially vertical axis and having means associated with the periphery thereof for serially transporting the workpieces along said work path, said work path being of arcuate extent and generated substantially about said first substantially vertical axis;

first support means supported for rotation synchronously with said conveying wheel and including a plurality of upper workpiece-engaging mechanisms disposed in uniform angularly spaced relationship above and around said conveying wheel, each said upper workpiece-engaging mechanism having an upper workpiece-engaging head which is movable downwardly for engaging an upper end of a respective workpiece;

second support means supported for synchronous rotation with said conveying wheel and including a plurality of lower workpiece-engaging mechanisms disposed in uniform angularly spaced relationship below and around the periphery of said conveying wheel, each said lower workpiece-engaging mechanism having a head portion which is movable vertically upwardly for engaging a lower end of a respective workpiece;

said first electrode being stationarily positioned adjacent but radially outwardly from the periphery of said conveying wheel and extending over only a small arcuate extent thereof; and said movable electrode comprising a substantially circular wheel which is supported for rotation about a second substantially vertical axis.

3. An apparatus according to claim 2, wherein said movable electrode is of substantially large diameter and has said second axis disposed adjacent but radially spaced from said first axis, said second axis being disposed radially between said first axis and said first electrode.

4. An apparatus according to claim 3, comprising drive means for causing rotation of said movable electrode at a velocity such that the peripheral velocity of said second electrode surface is approximately twice the velocity of the workpieces as they move along said work path.

5. An apparatus according to claim 3, comprising radially-movable means for adjustably movably supporting said movable electrode for radial displacement relative to said first axis for maintaining said second electrode surface in substantially uniform contact pressure with the workpiece.

6. An apparatus according to claim 3, wherein said first electrode surface as measured along said work path has a maximum length which only slightly exceeds one-half the circumferential length of the workpiece.

7. An apparatus according to claim 1, wherein said second electrode surface moves along an endless path at a velocity which is approximately twice the velocity of movement of the workpieces along said work path.

8. An apparatus according to claim 1, comprising drive means for effecting movement of said second electrode surface at a velocity which, at least during the time interval when said second electrode surface is disposed in engagement with the workpiece, is approximately twice the velocity of movement of the workpiece along said work path.

9. An apparatus according to claim 1, wherein said welding electrode means simultaneously creates two overlapping series-connected seam welds which individually extend around about 180° of the workpiece to create a 360° circumferential seam weld around the workpiece.

10. An apparatus according to claim 1, wherein at least a part of said work path is of circular arcuate extent as defined about a first substantially vertical axis, said first and second electrodes being disposed for engaging the respective workpieces as they move through said part of said work path which is of circular arcuate extent, said first electrode being positioned adjacent one side of said part of said work path of arcuate extent, said movable electrode being positioned adjacent the other side of said part of said work path of arcuate extent, said movable electrode comprising a substantially circular wheel which is supported for rotation about a second substantially vertical axis.

11. An apparatus according to claim 10, wherein said second axis is positioned radially between said first axis and said part of said work path of circular extent.

12. An apparatus for creating a circumferential seam weld around a cylindrical workpiece, comprising:
a frame;
workpiece transporting means movably supported on said frame and including a conveying wheel supported for rotation about a first substantially vertical axis, said conveying wheel having a plurality of substantially uniformly and angularly spaced recesses formed in the periphery thereof, each said recess being adapted to accommodate a cylindrical workpiece therein, and drive means for rotatably driving said conveying wheel at a substantially uniform rotational velocity whereby each workpiece is continuously moved along an arcuate work path at a predetermined velocity;
workpiece-supporting means associated with and rotatable synchronously with said conveying wheel for supportingly engaging a lower end of the workpiece as it is moved through a selected arcuate extent of said work path, said workpiece-supporting means including an engaging head which is movable vertically for engaging the lower end of said workpiece, said engaging head permitting the workpiece to rotate relative thereto about a longitudinally extending central axis of the workpiece;

welding means including opposed inner and outer electrodes disposed adjacent said work path for simultaneously (1) engaging diametrically opposite sides of the workpiece, (2) effecting rotation of the workpiece through a predetermined angle, and (3) creating diametrically opposite continuous seam welds which extend in series around the periphery of the workpiece, said welding means including means for effecting rotation of at least one of said electrodes relative to the other of said electrodes at a velocity which is different from said predetermined velocity of said workpiece along said arcuate path, whereby the workpiece is caused to rotate about its longitudinal axis as the workpiece is moved between said inner and outer electrodes.

13. An apparatus according to claim 12, wherein said outer electrode is maintained stationary and has a first electrode surface thereon which is spaced radially outwardly from said conveying wheel for engaging the workpiece, said first electrode surface extending through a predetermined arcuate distance, said inner electrode having a second electrode surface thereon which is of a convex configuration generated about a predetermined radius so that the second electrode surface extends approximately parallel with said work path over a predetermined arcuate distance thereof, said inner electrode being supported for rotation about a second substantially vertical axis which substantially intersects a radial line which extends perpendicularly between said first substantially vertical axis and said first electrode surface, and drive means for causing rotation of said inner electrode, when it is engaged with the workpiece, at a rotational velocity which substantially exceeds the rotational velocity of said conveying wheel.

14. An apparatus according to claim 13, wherein said inner electrode is formed as a wheel of a predetermined diameter, said predetermined diameter of said inner electrode being a predetermined amount smaller than the diameter of said conveying wheel, and said second substantially vertical axis being parallel to but spaced radially from said first substantially vertical axis.

15. An apparatus according to claim 13, wherein said welding means effects rotation of the workpiece through a predetermined angle of about 180° and creates diametrically opposite continuous seam welds which extend in series around the periphery of the workpiece so that the welds overlap at opposite ends to create a 360° circumferential seam weld, and wherein said first electrode surface extends along an arcuate extent which is of a length which only slightly exceeds one-half the circumferential peripheral length of the workpiece.

16. A method for creating a circumferential seam weld around cylindrical workpieces, comprising the steps of:

moving cylindrical workpieces in series and in spaced relationship along a work path at a predetermined velocity, said workpieces being oriented such that the longitudinal central axes thereof extend substantially perpendicularly to said work path;

providing first and second welding electrodes having opposed first and second electrode surfaces thereon, respectively, in opposed relationship adjacent opposite sides of said work path, the spacing between said electrode surfaces being sized to accommodate the workpieces therebetween, said electrode surfaces being elongated in a direction parallel to said path;

moving the workpieces sequentially along said work path into the gap between said electrode surfaces so that said electrode surfaces engage the exterior cylindrical surface of the workpieces at substantially diametrically opposite points thereon;

relatively moving said first and second electrode surfaces with respect to one another for effecting rotation of the workpieces about their longitudinal axes as the workpieces are continuously moved along said work path; and applying a welding current through said first and second welding electrodes as they engage diametrically opposite sides of the workpieces to create two circumferentially extending seam welds as the workpieces rotate about their longitudinal central axes as they move between said first and second welding electrodes.

17. A method according to claim 16, comprising the step of maintaining said first welding electrode stationary while rotating said second welding electrode at a preselected velocity.

18. A method according to claim 17, comprising the step of rotating said second welding electrode at a preselected velocity which is approximately twice said predetermined velocity for causing rotation of said workpiece simultaneously with the transporting thereof through the welding gap between said welding electrodes.

19. A method according to claim 17, comprising the step of creating said two circumferentially extending seam welds through sufficient arcuate extent such that said two seam welds join together in series and overlap at opposite ends so as to create a continuous 360° seam weld around said workpiece.

* * * * *